United States Patent [19]

Mulder

[11] Patent Number: 5,259,959
[45] Date of Patent: * Nov. 9, 1993

[54] ANOXIC AMMONIA OXIDATION
[75] Inventor: Arnold Mulder, Delft, Netherlands
[73] Assignee: Gist-Brocades N.V., Netherlands
[*] Notice: The portion of the term of this patent subsequent to Jan. 7, 2009 has been disclaimed.
[21] Appl. No.: 782,399
[22] Filed: Oct. 25, 1991

Related U.S. Application Data

[62] Division of Ser. No. 427,849, Oct. 4, 1989, Pat. No. 5,078,884.

[30] Foreign Application Priority Data

Feb. 2, 1988 [NL] Netherlands .................. 88200204

[51] Int. Cl.$^5$ .................................. C02F 3/34
[52] U.S. Cl. .................................. 210/610; 210/903
[58] Field of Search ............ 210/603, 605, 610, 611, 210/630, 631, 903

[56] References Cited

U.S. PATENT DOCUMENTS 4,522,663 11/1985 Spector et al. .................. 210/605

Primary Examiner—Thomas Wyse
Attorney, Agent, or Firm—Bierman & Muserlian

[57] ABSTRACT

A biological denitrification is provided in which ammonium ion is used as an electron donor in the denitrification. The process may advantageously be used under conditions of high ammonium ion concentrations in waste water or to remove ammonium ion from manure, soil or surface water. Microorganisms are described which may be used in these processes.

7 Claims, 5 Drawing Sheets

ANOXIC AMMONIA OXIDATION

PRIOR APPLICATION

This application is a division of U.S. patent application Ser. No. 427,849 filed Oct. 4, 1989, now U.S. Pat. No. 5,078,884.

The present invention relates to a process for biological denitrification combined with the oxidation of ammonium ions.

The denitrification process is based on the reduction of nitrate or nitrite ions into nitrogen gas, via the intermediate nitrogen oxides NO and $N_2O$, by, in essence, aerobic bacteria, see for example R. Knowles, Denitrification, Microbiol. Rev., 46, 43 (1982). The above mentioned nitrogen oxides often act as terminal electron acceptors in the absence of oxygen. Under anoxic conditions, the overall reaction will be (R. K. Thauer et al.; Energy conservation in chemotrophic anaerobic bacteria, Bacteriol. Rev. 41, 100 (1977)):

$$2 NO_3^- + 2 H^+ + 5 H_2 \longrightarrow N_2 + 6 H_2O \quad (1)$$

$$\Delta G^{01} = -1120.5 \text{ kJ/reaction}$$

In respect of the electron donor, distinction can be made between heterotrophic denitrification, with organic compounds used as electron donor, and autotrophic denitrification with sulphide used as electron donor (see U.S. Pat. No. 4,384,956).

E. Broda (Two kinds of lithotrophs missing in nature, Z. Allg. Microbiol. 17, 491 (1977)) suggested that, in theory, ammonium ion can be used as inorganic electron donor as well:

$$2 NH_4^+ \longrightarrow N_2 + 2 H^+ + 3 H_2 \quad (2)$$

$$\Delta G^{01} = +79 \text{ kJ/reaction}$$

The overall denitrification reaction (reaction scheme 3) is then rather exergonic.

$$5 NH_4^+ + 3 NO_3^- \longrightarrow 4 N_2 + 9 H_2O + 2 H^+ \quad (3)$$

$$\Delta G^{01} = -1483.5 \text{ kJ/reaction}$$
$$= -297 \text{ kJ/M.NH}_4^+$$

Therefore E. Broda suggested that denitrifying microorganisms which use ammonium ion as electron donor, theoretically may exist. However, the existence of these microorganisms has never been demonstrated, as is indicated in the title of the article by E. Broda "lithotrophs missing in nature".

As a result of extensive research and experimentation we have now surprisingly found a process for biological denitrification in which ammonium ion is used as electron donor in the denitrification.

The advantages of the process are enormous, much less oxygen is required for the ammonium ion oxidation and no extra carbon-source is necessary to achieve denitrification.

The process may advantageously be applied under conditions of high ammonium ion concentrations in waste water or in cases in which conventional nitrification will result in high concentrations of nitrate ion in the effluent. For example the process may be applied in the purification of fish ponds, swimming pools or manure.

Generally, the denitrification process is preferably carried out at pH of 5-9, more preferably 6-8 and preferably at a temperature of 5° to 60° C., more preferably 15° to 40° C. The process is preferably used under conditions resulting in 5-5000 mg/l $NH_4^+$—N and 0-5000 mg/l $NO_3^-$—N. This gives an overall efficiency of at least 80-90% nitrate removal according to reaction scheme 3.

According to another advantageous aspect of the invention a process is carried out in which the combination of reactions 3 and 4 takes place resulting in the overall reaction scheme 5

$$NH_4^+ + 2 O_2 \longrightarrow NO_3^- + H_2O + 2 H^+ \quad (4)$$

$$\Delta G^{01} = -348.9 \text{ kJ/reaction}$$

$$8 NH_4^+ + 6 O_2 \longrightarrow 4 N_2 + 12 H_2O + 8 H^+ \quad (5)$$

In this process part of the ammonium ion is oxidized into nitrate ion by nitrifying bacteria. This nitrate ion will be treated further with the remaining ammonium ion, according to reaction scheme 3. This process may be applied where substantially no nitrate is present or when the ratio of nitrate and ammonia is not in proportion to reaction scheme 3.

A person skilled in the art will easily find optimal microbiological conditions or will be able to design appropriate reactor(s) in which the process of the invention is to be carried out. For example, when using the process in a waste water purification plant, in which reaction 5 will take place, it is possible to denitrify in more than one reactor, in each part of this the process occurs. One reactor in which the whole process takes place is also possible, for example, by using zones having different reaction conditions or by immobilising all necessary microorganisms on a particulate solid phase e.g. on solid particles.

The process of the invention is advantageously carried out, for example when treating waste water in an activated sludge reactor, fluidized-bed reactor or fixed film reactor.

The ammonium ion oxidation into nitrogen gas using nitrate ion (according to reaction scheme 3) appears from the difference in ammonium ion concentration in the influent and effluent of the process of the invention. Other indications for the presence of ammonium ion oxidation appear from:

Increase of the use of nitrate ion. At substantially equal nitrate ion supply the nitrate ion concentration in the effluent will decrease proportional with the capacity of the ammonium oxidation.

Increase of gas production. This partly coincides with the increased conversion of nitrate ion, but because of the conversion of ammonium ion into nitrogen gas (reaction scheme 3), extra gas is produced as well.

Redox balance. This balance is in equilibrium and makes allowance for the oxidation of the ammonium ion.

Decrease in pH. During the ammonium ion oxidation (see reaction scheme 3), acid is formed. This may result in a decrease of pH of for example 0.1–0.5 pH unit.

Another aspect of the invention provides the microorganisms which are capable of bringing about the above described process. Preferably these microorganisms are bacteria. The microorganisms may be obtained by natural selection (see for example Example 1) and may be cultivated further in order to use them as inoculation material. They may be present in isolated culture form or may be present as a sludge, preferably a granular sludge, or immobilized sludge. An example of suitable sludge is deposited with the CBS (Centraal Bureau voor Schimmelcultures, Oosterstraat 1, 3742 SK Baarn, The Netherlands) under the accession number CBS 949,87 on Dec. 12, 1987.

The microorganisms may be enriched by inoculation of an anaerobic chemostat feed with mixtures (in e.g. a molar ratio of 5:3) of $NH_4^+$ and $NO_3^-$ as electron donor and electron acceptor. The above mentioned sludge may be used as inoculum. After enrichment the microorganisms may be isolated using standard isolation techniques for ammonium ion oxidizing bacteria as described by B. Sorriano and M. Walker (J. Applied Bacteriology 31: 493–497 (1968)).

Alternatively, number dilution series of chemostat cultures will permit the isolation of the microorganisms by procedures and techniques well understood by persons skilled in the art.

According to another embodiment of the invention (waste) material containing ammonium ion such as manure is inoculated with cultures of the anaerobic ammonium ion oxidizing microorganisms. The cultures may be added in isolated culture form, or as sludge, optionally obtained from processes in which these microorganisms may be present or cultivated.

When, for example, liquid manure is treated according to the invention, an electron acceptor such as nitrate ion may be added to the liquid manure in addition to the inoculated microorganisms.

The liquid manure is often dispersed as such across farming land. Such distribution of the manure on the land is one of the known sources of the so-called acid rain.

Ammonium ion originating from, for example, manure, distributed on farming land is taken up in the air in $NH_4^+$ form. During rainfall, the $NH_4^+$ enters the soil or surface water. The nitrifying bacteria then produce the acid according to reaction scheme 4. When $NO_3^-$ is denitrified, part of the acid is removed according to reaction scheme 1. There is a net gain of one $H^+$ produced per $NH_4^+$ denitrified. Because the denitrification does not usually take place completely, part of the nitrate ion will accumulate in surface water.

Addition of the microorganisms described above, to a farming land on which manure is spread, will reduce the volatalisation of ammonia which consequently leads to a reduction of stench emission and contributes to reduce the acid rain problem.

When the ammonia is added to the land, part of this ammonia will be oxidized into nitrate ion by nitrifying bacteria already present in the soil.

The added anaerobic ammonium ion oxidizing microorganisms will be able to convert the ammonia and nitrate ion into odourless gaseous nitrogen, subsequently. Although still acid is formed, now only one $H^+$ is produced per $2\frac{1}{2}$ $NH_4^+$.

Moreover according to this aspect of the invention less nitrate ion will accumulate in the surface water since part of the nitrate will be denitrified. The microorganisms of the invention may be applied as well on the farming land which is treated with manure as well as on other soil, water (fish ponds, swimming pools, lakes, etc.), which are or will be exposed to acid rain.

The present invention will be illustrated by the following examples, however, without restricting the scope of the invention.

EXAMPLE 1

Figure 1:
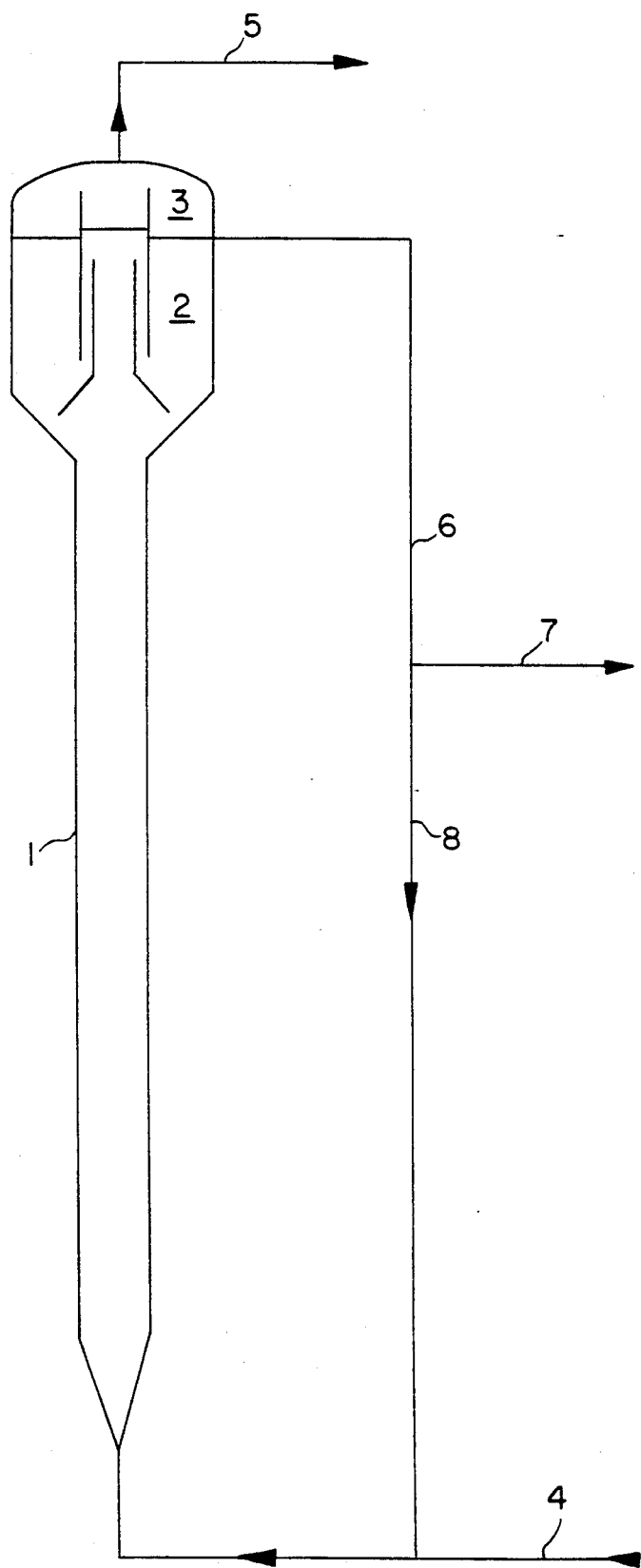
FIG. 1 shows a fluidized-bed reactor in which the process take place.

On top of a fluidized-bed reactor (1) of 17 l capacity and a diameter of 10 cm, a three-phase separator with a content of 6 l was situated (see FIG. 1).

The fluidized bed was inoculated with carrier overgrown with biomass originating from a denitrification process. During steady state process conditions, the carrier concentration was 225–275 g/l (3.8–4.7 kg/17 l) corresponding with 150–300 mg o.s./g carrier (o.s.=organic solids) and a mean biomass concentration of 14 g o.s./l. The terminal velocity of the carrier material (sand, 0.3–0.6 mm in diameter) was 175 m/h determined at 30° C. in $H_2O$. The terminal velocity of the overgrown carrier material was 95–145 m/h.

The superficial liquid velocity in the column was maintained during the experiment at 30–34 m/h.

The liquid leaving the reactor via pipe (6) was partly recirculated via pipe (8), the remaining part was discharged via pipe (7).

Waste water (4) was introduced together with the recirculated part of the effluent.

The gas formed was collected in chamber (3) and discharged via pipe (5).

The liquid in the reactor was kept at 36° C. The pH was 6.9–7.2.

To obtain the conversion rates the following parameters were measured
 the liquid and gas flows, gas composition
 influent: $NH_4^+$, $NO_3^-$, $NO_2^-$ and $SO_4^{2-}$ contents
 effluent: $NH_4^+$, $NO_3^-$, $NO_2^-$ and $SO_4^{2-}$ contents.

Via pipe (4) a mixture of $NaNO_3$ (400–500 ml/h of a 75 g/l solution) and waste water (5–6 l/h) was introduced. The mean composition of the waste water was: $COD_{centrifuged}$ 500–800 mg/l, sulfide 125–130 mg S/l, volatile fatty acids about 50 mg COD/l, ammonium 100–140 mg N/l. The hydraulic residence time was kept at 3.8–4.6 h. After about 2 months the ammonium ion oxidation started (see FIGS. 2 and 3). At steady state conditions, the following date were obtained:

Denitrification specific conversion rate of nitrate ion: 0.5–0.6 kg $NO_3^-$—N/m³.d
 (nitrogen removed via ammonium ion oxidation is excluded)
conversion rate on basis of sludge: 0.05–0.07 kg $NO_3^-$—N/kg.o.s.d.
 (nitrogen removed via ammonium ion oxidation is excluded).

Sulphide ion oxidation specific conversion rate of sulphide ion: 0.7-0.8 kg $S/m^3.d$ conversion rate on basis of sludge: 0.07-0.08 kg S/kg o.s.d.

Ammonium ion oxidation specific conversion rate of ammonium ion: 0.4 kg $NH_4^+$—$N/m^3.d$ conversion rate on basis of sludge: 0.04 kg $NH_4^+$—N/kg o.s.d.

Figure 2:
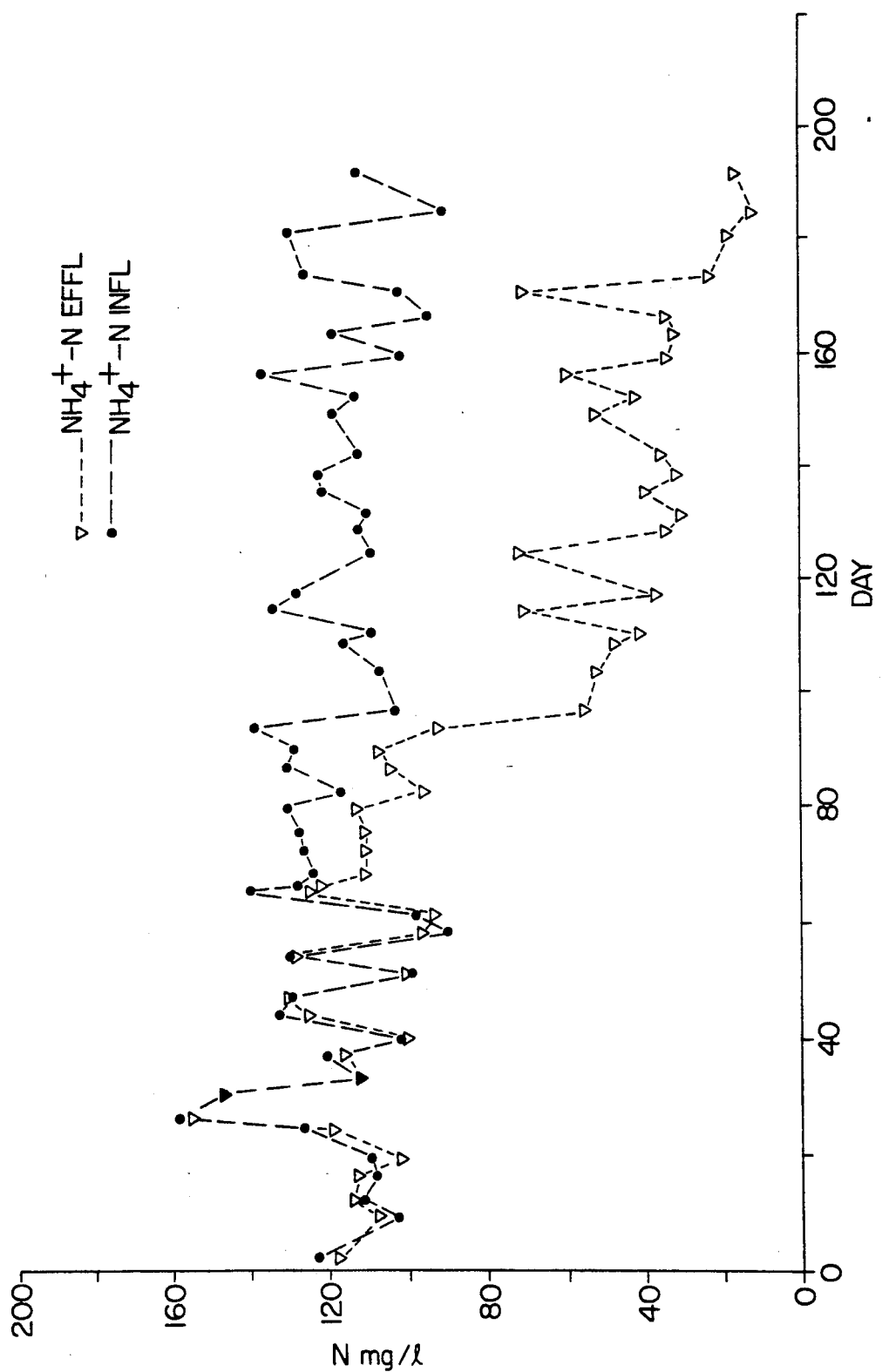
FIG. 2 shows the concentrations of ammonium in influent and effluent of a fluidized-bed reactor process.
Figure 3:
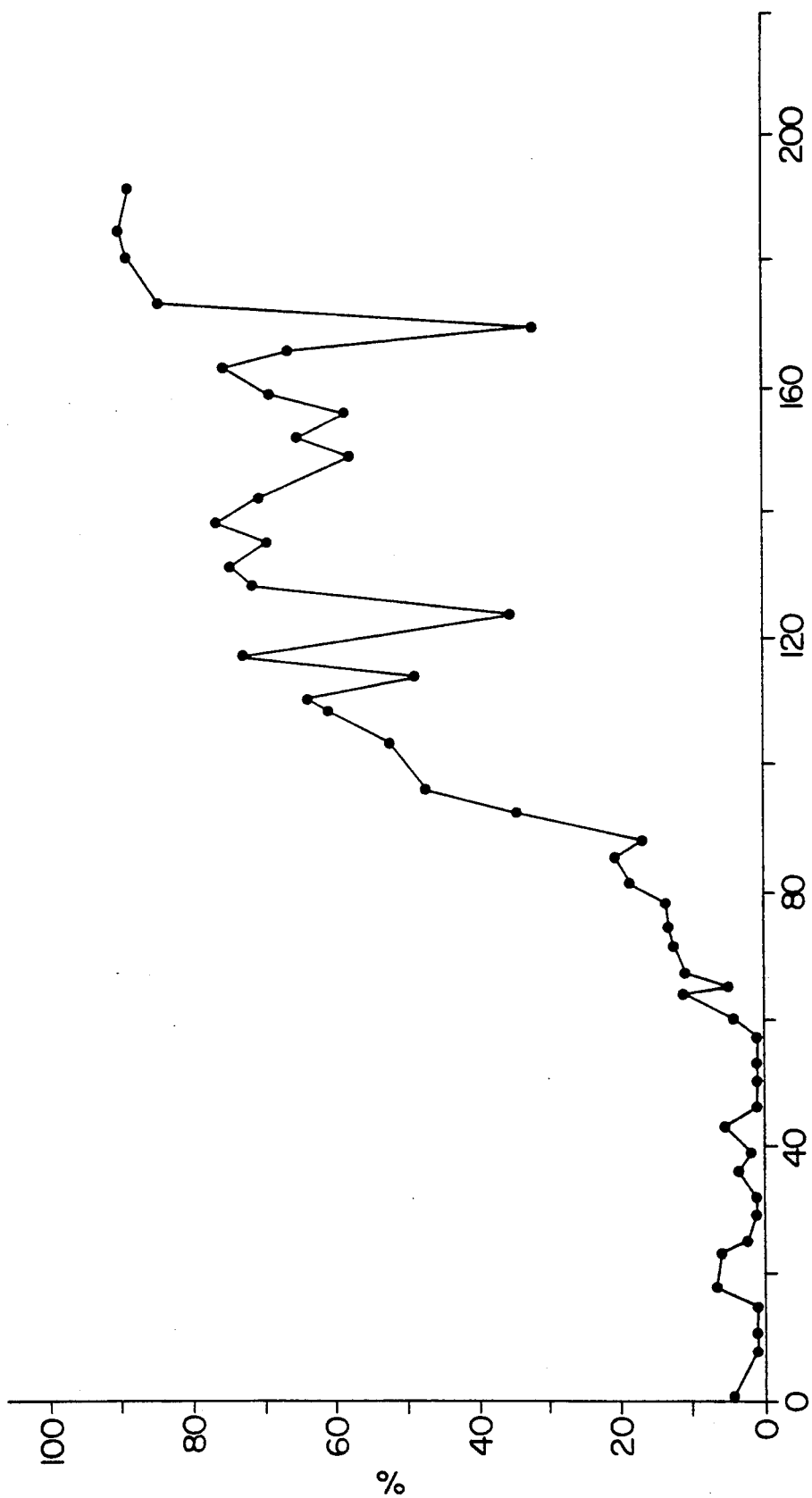
FIG. 3 shows the efficiency of the anoxic ammonium removal in this fluidized-bed reactor process.

In FIG. 2, the $NH_4^+$—N concentrations of the influent and effluent are given as a function of time. As mentioned above, after about 2 months the ammonium ion oxidation process starts and the ammonium ion concentration in the effluent becomes lower than in the influent. FIG. 3 shows the efficiency increases after 2 months up to at least 80%.

EXAMPLE 2

A stirred batch reactor (2.4 l) was inoculated with 4.0 g sludge (CBS 949.87) on the carrier (160 mg o.s./g carrier) originating from the earlier described fluidized-bed reactor in Example 1.

The temperature wa maintained at 36° C. and the pH was 7.0 at the beginning and 7.5 at the end of the experiment (after 700 h).

Figure 4:
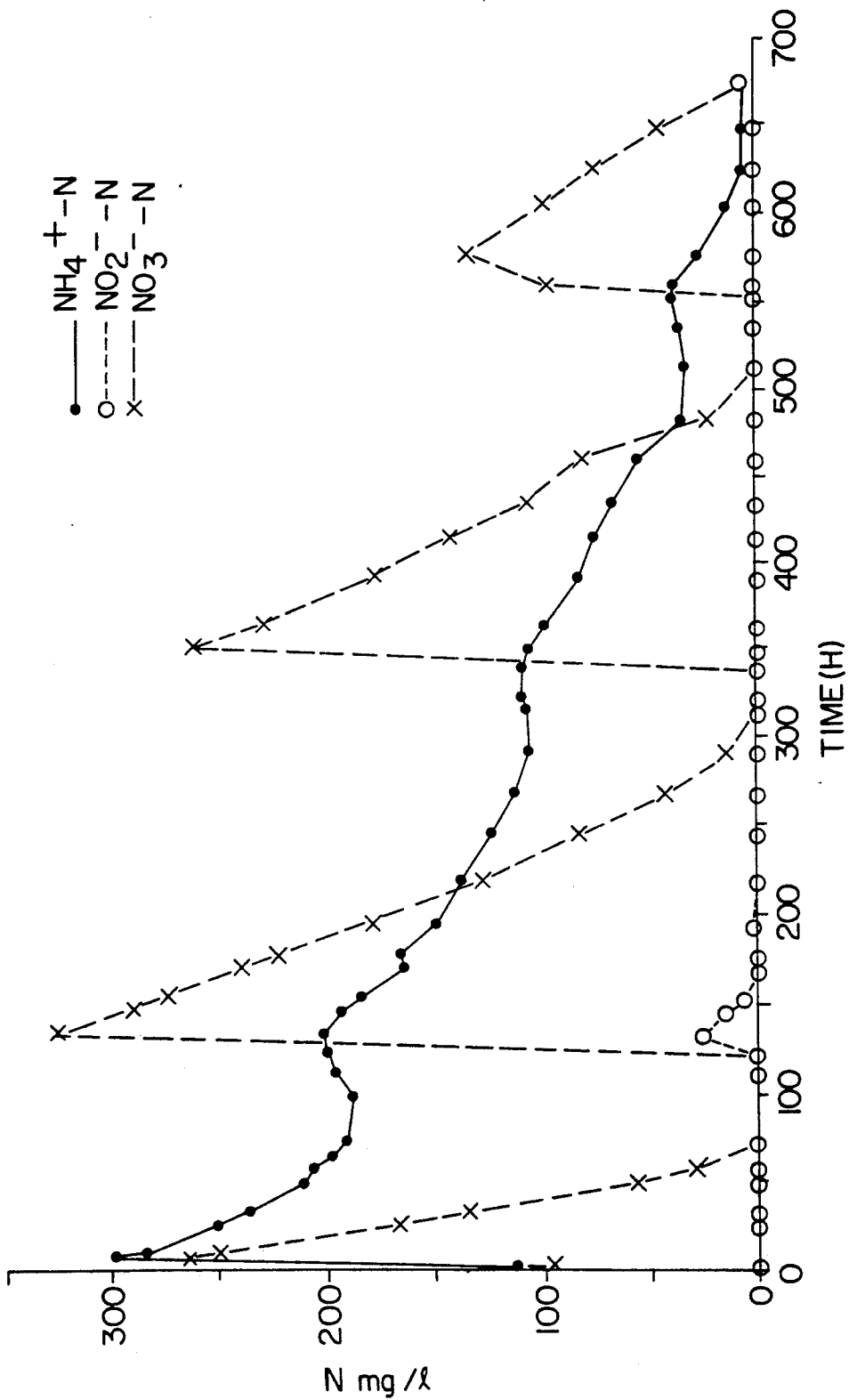
FIG. 4 shows the ammonium and nitrate concentrations during a batch experiment.

The concentrations of the ammonium ion and the nitrate ion in the reaction liquid are shown in FIG. 4. At time zero, ammonium ion as well as nitrate ion was added. When the nitrate ion concentration became low or no longer detectable, another quantity of nitrate ion was added.

50 mM $NH_4^+$—N and 178 mM $NO_3^-$—N were added in total during the experiment. Theoretically this corresponds with 114 mM $N_2$. During the experiment the amount of gas was measured (FIG. 5) and the percentage of $N_2$ in this gas was determined. The amount of $N_2$ produced was 124 mM which corresponds rather well with the quantity theoretically expected.

Figure 5:
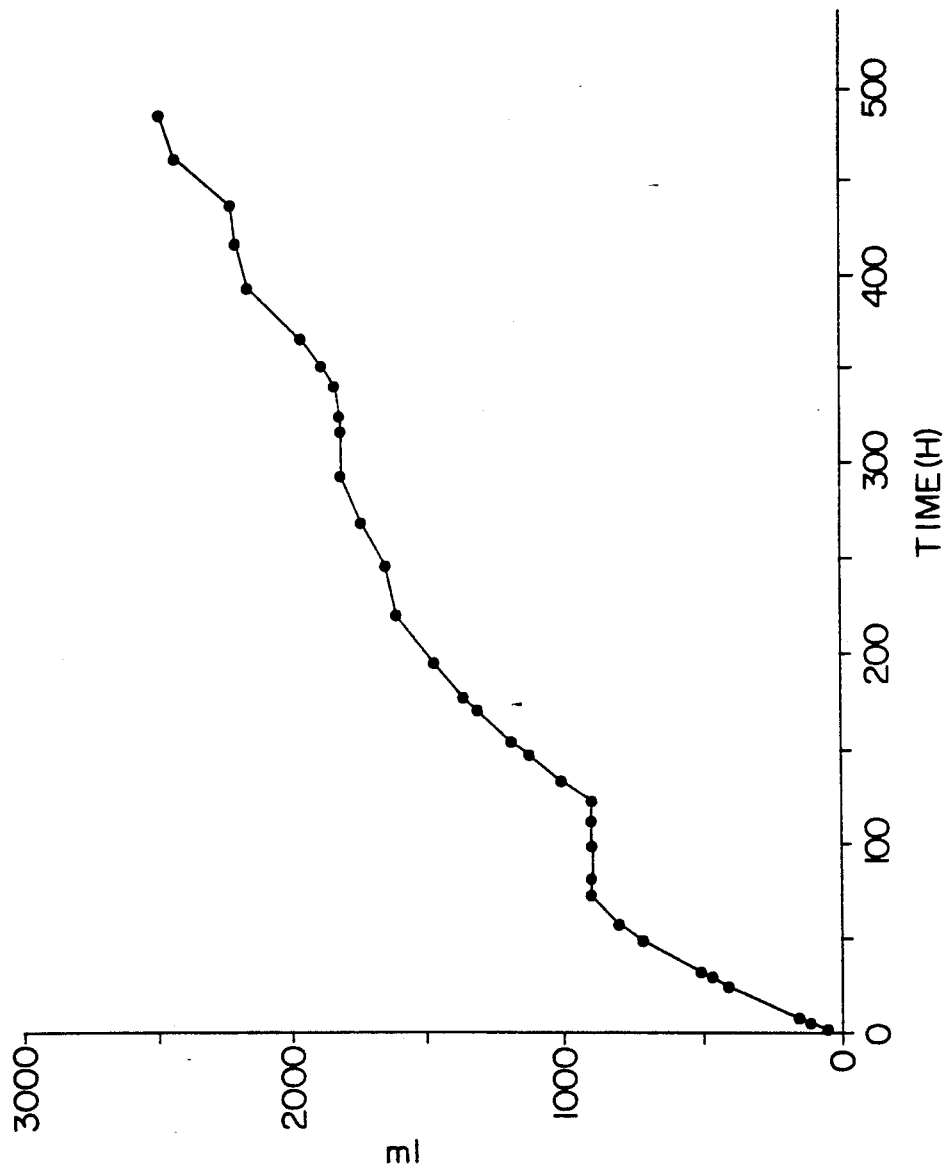
FIG. 5 shows the gas production during this batch experiment.

FIG. 5 shows that during the experiment when after some time the nitrate ion concentration became zero the removal of ammonium ion stopped. The conversion of ammonium ion started again when nitrate ion was added.

FIG. 6 shows that when the removal of ammonium ion stopped, the gas production stopped as well.

The overall conversion rate of ammonium ion was 0.7 mg $NH_4^+$—N/g o.s.d and the nitrate ion conversion rate was 2.0 mg $NO_3^-$—N/g o.s.d.

What is claimed is:

1. A process for biological denitrification comprising the use of a microorganism or a combination of microorganisms capable of bringing about the biological anaerobic denitrification in which ammonium ion is used as electron donor.

2. Process according to claim 1 wherein part of the ammonium ion is oxidized into the nitrate to be denitrified.

3. Process according to claim 1 wherein the denitrification is carried out in a waste water purification process.

4. Process according to claim 1 wherein the denitrification is used to remove ammonium ion from manure.

5. Process according to claim 1 wherein the denitrification is used to remove ammonium ion from soil or surface water.

6. Process according to claim 5 wherein the ammonium ion originates from manure.

7. Process according to claim 5 wherein the ammonium ion originates from acid rain.

* * * * *